United States Patent
Bae et al.

(10) Patent No.: US 7,492,102 B2
(45) Date of Patent: Feb. 17, 2009

(54) DIELECTRIC/BARRIER RIB COMPOSITION FOR PLASMA DISPLAY PANEL AND MANUFACTURING METHOD THEREOF

(75) Inventors: Byeong-Soo Bae, Daejeon (KR); Tae-Ho Lee, Daejeon (KR); Young-Joo Eo, Daejeon (KR); Jung-Hwan Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 505 days.

(21) Appl. No.: 11/062,762

(22) Filed: Feb. 22, 2005

(65) Prior Publication Data

US 2005/0234167 A1    Oct. 20, 2005

(30) Foreign Application Priority Data

Apr. 6, 2004    (KR) .................. 10-2004-0023395

(51) Int. Cl.
  *H01J 17/49*    (2006.01)
  *B32B 9/04*    (2006.01)
(52) U.S. Cl. .................. 313/586; 345/47; 428/429; 428/447; 524/430; 524/439
(58) Field of Classification Search ............. None
  See application file for complete search history.

(56) References Cited

U.S. PATENT DOCUMENTS

| | | | | |
|---|---|---|---|---|
| 5,212,274 A | * | 5/1993 | Tsukuno ............... | 528/14 |
| 5,352,724 A | * | 10/1994 | Fujiki et al. .......... | 524/398 |
| 5,444,106 A | * | 8/1995 | Zhou et al. ........... | 523/107 |
| 6,940,227 B2 | * | 9/2005 | Aoki et al. ............ | 313/586 |
| 2004/0246204 A1 | | 12/2004 | Aoki et al. | |
| 2005/0123774 A1 | * | 6/2005 | Tashiro ................. | 428/447 |

FOREIGN PATENT DOCUMENTS

| | | | |
|---|---|---|---|
| JP | 57-139141 | * | 8/1982 |
| JP | 09-102273 A | | 4/1997 |
| JP | 09-199037 A | | 7/1997 |
| JP | 09-278482 A | | 10/1997 |
| JP | 2000-124501 A | | 4/2000 |
| JP | 2005-36089 | * | 2/2005 |
| WO | WO 02/47814 A1 | | 6/2002 |
| WO | WO 03-087288 A1 | * | 10/2003 |

OTHER PUBLICATIONS

English Language Abstract for Tadahiko et al., "Manufacture of Plasma Display Panel," JP 9-102273 (1997).
English Language Abstract for Masaaki et al., "AC Type Plasma Display Panel," JP 9-199037 (1997).
English Language Abstract for Shoji, "Low Dielectric Constant Glass Composition," JP 9-278482 (1997).
English Language Abstract for Hiroyuki et al., "Light-Emitting Diode," JP 2000-124501 (2000).
Boeuf, J.P., et al., "Physics and Modeling of Plasma Display Panels," *J. Phys. IV*. France 7:C4-3-C4-14, EDP Sciences (1997).

* cited by examiner

*Primary Examiner*—Marc S Zimmer
(74) *Attorney, Agent, or Firm*—Sterne, Kessler, Goldstein & Fox P.L.L.C.

(57) ABSTRACT

Provided is a dielectric/barrier rib composition for a plasma display panel, comprising a compound 1 of the formula

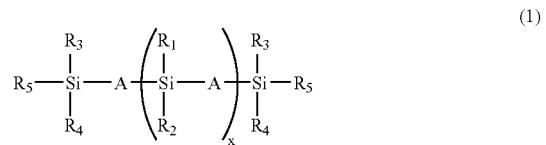

(1)

or at least one compound belonging to a polyhedral oligosilsesquioxane (compound 2) having $R_6SiO_{1.5}$ as a repeating unit, or comprising inorganic/organic hybrid materials having compounds 1 and 2 as a monomer, wherein X is an integer inclusive 0, $R_1$, $R_2$, $R_3$, $R_4$, $R_5$ and $R_6$ are independently a linear, branched or cyclic $C_1$-$C_{12}$ hydrocarbon group containing one or more alkyl, alkoxy, ketone, acryl, methacryl, allyl, aromatic, halogen, amino, mercapto, ether, ester, sulfone, nitro, hydroxyl, cyclobutene, carbonyl, carboxyl, alkyd, urethane, vinyl, nitrile, hydrogen, or epoxy functional group, and A is oxygen or NH. The inorganic/organic hybrid materials can be a material composed of an extended matrix, containing silicon and oxygen or nitrogen atoms, and having at least one silicon fraction directly bonded to a substituted or unsubstituted hydrocarbon atom.

22 Claims, No Drawings

DIELECTRIC/BARRIER RIB COMPOSITION FOR PLASMA DISPLAY PANEL AND MANUFACTURING METHOD THEREOF

This application claims priority to Korean Patent Application No. 10-2004-0023395, filed Apr. 6, 2004, which is incorporated by reference herein in its entirety.

BACKGROUND OF THE INVENTION

1. Field of the Invention

The present invention relates to a dielectric/barrier rib composition for a plasma display panel, and more particularly to a composition used for forming a transparent dielectric layer and a barrier rib on an electrode for a plasma display panel.

2. Description of the Related Art

A transparent dielectric for a plasma display panel is disposed on a front panel having an ITO (Indium Tin Oxide) and metal electrode patterned thereon and is made by calcining glass paste, including glass powder having a maximum particle size smaller than an average thickness of a film thereof, to form a film having a thickness of 20 μm to 40 μm, in order to secure high transparency. The glass paste is a mixture of $PbO$—$B_2O_3$—$SiO_2$ based glass powder containing an excess amount of PbO and a filler, an organic solvent and a polymeric resin. The dielectric film is made by forming a thick film on the glass substrate by a screen printing method using the glass paste followed by calcination at a high temperature of 500° C. to 600° C. To obtain high transparency in the dielectric film, it is important to remove bubbles contained in the dielectric layer. It is also important to precisely control composition, particle size, conditions for manufacturing and calcination of glass powder, etc.

A front panel dielectric of an alternating current type plasma display panel forms a wall charge, thereby maintaining discharge-holding voltage, and serves to protect the electrode from ion bombardment occurring upon discharging. Conventionally, the dielectric layer needs to have a thickness of about 40 μm, transmittance of more than 80%, and DC breakdown voltage greater than 5 kV.

Breakdown voltage of front panel dielectric is a very critical factor in driving the plasma display panel. For the dielectric utilizing glass paste, the breakdown voltage is decreased due to bubbles produced by calcining conditions and surface conditions of the glass powder. Also, metal Pb remaining inside the film after calcination lowers the breakdown voltage of the dielectric layer, thus resulting in deterioration of dielectric performance.

When utilizing a frit containing a low melting point glass as a main component, it is still difficult to obtain a low temperature calcination type transparent dielectric material without addition of an excess amount of Pb. Similarly, the low melting point glass paste also requires high temperature calcination at a temperature of 550° C. to 580° C. A thermal hysteresis process at high temperature of more than 500° C. causes many disadvantages such as changes in the dimensions of the glass substrate, patterns that cross each other which results in defective display panels, and difficulty in realizing a large screen of the panel.

The low melting point glass containing primarily Pb has disadvantages such as a high dielectric constant of 10 to 12 and increased power consumption of the device due to generation of high current upon discharging. In particular, the manufacturing of the barrier rib of the back panel produces a large amount of waste materials, thus increasing environmental contamination and waste material disposal costs. Japanese Patent Publication Laid-Open Nos. Hei 9-199037 and 9-278482 propose $Na_2O$—$B_2O_3$—$SiO_2$ based glass and $Na_2O$—$B_2O_3$—$ZnO$ based glass, having lower dielectric constants than conventional compositions and softening points of 500° C. to 600° C. Both glass compositions contain no Pb component. These glass compositions contain a softening point lowering component composed of an alkaline metal oxide such as $Na_2O$, $K_2O$ and $Li_2O$ added thereto, and thus it is possible to perform calcination of the dielectric layer at a relatively low temperature. However, when glass to which a softening point lowering component has been added is used in the dielectric layer, there is a possibility of yellowing in the dielectric layer or front glass panel. Glass compositions containing a softening point lowering component base limit the use of general substrates such as inexpensive soda lime glass or plastic substrate due to the high calcination temperature of more than 500° C.

Further, International Patent Application PCT/JP2002/006666 proposes zinc oxide, boron oxide, lithium oxide, sodium oxide, potassium oxide, rubidium oxide, cesium oxide, copper oxide, silver oxide, manganese oxide(IV), cerium oxide(IV), tin oxide(IV), and antimony oxide(IV) as components constituting the dielectric, in order to reduce yellowing occurring in $Na_2O$—$B_2O_3$—$SiO_2$ based glass and $Na_2O$—$B_2O_3$—$ZnO$ based glass. These materials also require a high calcination temperature of more than 500° C.

Screen-printing is usually used to form the dielectric layer employing the low melting point glass paste, but this process is very complicated due to formation of a thick film by repeated printing more than two times. In particular, the barrier rib of the back panel requires a relatively thick film as compared to the dielectric layer, and requires printing about eight times. However, the film utilizing glass paste shows changes in the flatness of the surface thereof depending on calcination conditions, thus careful attention is required in performing the process. In order to complement such a disadvantage seen in this screen printing method, Japanese Patent Publication Laid-Open No. 97-102273 discloses a process for preparing a plasma display panel comprising applying a glass paste composition on a support film, drying the coated film to form a material layer for forming a film on the support film, transferring the material layer thus formed onto the surface of the glass substrate having an electrode fixed thereon, and calcining the transferred film-formation material layer to form the dielectric layer on the surface of the glass substrate (Dry Film Process). This transfer method using a dry film simplifies the process, however, defects still occur in the dielectric due to calcination conditions because of the use of the conventional low melting point glass paste.

In addition, high power consumption of the plasma display panel functions as a disadvantage compared to a liquid crystal display (LCD) or organic OLED display device. High power consumption is due to the high dielectric constant of the dielectric layer (more than 10). Lowering the dielectric constant below 5 can reduce power consumption.

International Patent Application PCT/JP2001/02289 and Korean Patent Application 2002-46902 propose a dielectric and barrier rib composition capable of calcining even at a significantly lower temperature than a conventional low melting point glass containing Pb, and having a dielectric constant of less than 5, by using a silicon resin and inorganic/organic hybrid materials. This application also proposes a variety of processes for forming the dielectric, such as spin coating, bar coating and application in addition to a conventional printing method. Additionally, this technique has advantages in that it is highly applicable to the transfer method by the above-mentioned dry film and can reduce the decreased breakdown voltage due to bubbles upon calcining. When the silicon based resin or inorganic/organic hybrid material is used as the dielectric composition, conventional problems such as environmental contamination due to Pb component, deterioration of dielectric functions, high power consumption due to high dielectric constant, variations in precise dimensions due to high calcination temperature and substrate limitation can be resolved. In particular, low temperature calcination allows using plastics or soda lime glass substrate, thus being capable of lowering production costs of the plasma display panel.

Barrier rib material used in the back panel of the plasma display is prepared by adding a white or black pigment to the dielectric composition conventionally used in the front panel. Processes for preparing a variety of barrier rib shapes relative to the composition thereof have been proposed. The barrier rib structure is a structure formed on the dielectric covering a conventional electrode that is formed on a back panel glass having an address electrode patterned in parallel thereon. The barrier rib is disposed to maintain a discharge distance within the panel and prevent electrical and optical interference between adjacent cells. In some embodiments, it has a width of 70 µm to 100 µm and a height of 120 µm to 200 µm. In the case of 42 inch panels, conventionally, the dielectric layer corresponding to the total height of the barrier rib is made using the screen-printing method and then a barrier rib structure is formed using a sandblasting method. However, in preparing a HDTV grade plasma display panel having a size greater than 60 inches, smaller pitches between the structures and very low surface roughness are required, the screen printing through multi-layer printing or the sandblasting method is not suitable for preparing complex structures having precise dimensions.

In order to resolve complexity of the process due to the complicated multi-layer screen printing and the problems associated with uniform formation of the barrier rib dielectric over the entire panel, Japanese Patent Publication Laid-Open Nos. Hei 9-102273 and Hei 9-101653 suggest forming the barrier rib layer in a single process through the above-mentioned transfer film (a composite film composed of a film forming material layer obtained from the glass paste composition and support film, and a cover film laminated on the surface of the film forming material layer so as to be easily peeled off therefrom). Even though this method can simplify the process, it is not possible to avoid disadvantages such as limitation of substrate represented by the calcined low melting point glass, difficulty in patterning a microstructure, surface flatness, and the production of a large amount of environmental contamination waste material. Therefore, development of a material capable of obtaining high thickness in a single process and easy micropatterning is necessary for preparing a large screen high definition plasma display panel.

SUMMARY OF THE INVENTION

The present invention is directed to providing a dielectric/barrier rib composition for a plasma display panel having a low dielectric constant, and a thickness of more than 10 µm even at a calcination temperature of less than 200° C.

DETAILED DESCRIPTION

The present invention is directed to a dielectric/barrier rib composition for a plasma display panel, comprising a compound 1 of formula:

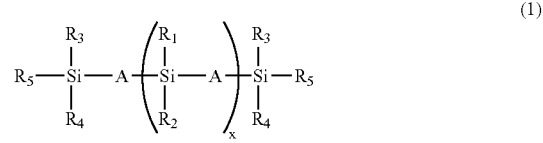

or at least one compound belonging to a polyhedral oligosilsesquioxane (compound 2) having $R_6SiO_{1.5}$ as a repeating unit, or comprising inorganic/organic hybrid materials having compounds 1 and 2, a monomer wherein X is an integer inclusive of zero; $R_1$, $R_2$, $R_3$, $R_4$, $R_5$ and $R_6$ are independently a linear, branched, or cyclic $C_1$-$C_{12}$ hydrocarbon group containing one or more alkyl, alkoxy, ketone, acryl, methacryl, allyl, aromatic, halogen, amino, mercapto, ether, ester, sulfone, nitro, hydroxyl, cyclobutene, carbonyl, carboxyl, alkyd, urethane, vinyl, nitrile, hydrogen, or epoxy functional group; and A is oxygen or —NH—. In some embodiments, the dielectric/barrier rib composition contains substantially no Pb and substantially no bubbling.

Further, the molecular weight of compound 1 can vary, depending on the characteristics required in the panel, and can be appropriately selected by those skilled in the art. Those skilled in the art will easily appreciate that compounds having specific molecular weights disclosed in the Examples below are provided only for illustrating the present invention and are not limiting.

The term "inorganic/organic hybrid materials" as used herein, refers to a material composed of an extended matrix containing silicon and oxygen or nitrogen atoms and having at least one silicon fraction directly bonded to a substituted or unsubstituted hydrocarbon atom.

In the $C_1$-$C_{12}$ hydrocarbon group, a portion of hydrogen atoms can be substituted with fluorine. In some embodiments, 4 to 8 hydrogen atoms can be substituted with fluorine.

Examples of materials corresponding to compound 1 include, but are not limited to, hexamethyldisiloxane, octamethyltrisiloxane, polydimethylsiloxane, poly(dimethylsiloxane-co-alkylmethylsiloxane), poly(dimethylsiloxane bis[[3-[2-aminoethyl]amino]propyl]diketoxysilyl]ether, poly[dimethylsiloxane-co-(3-aminopropyl)methylsiloxane], poly(diketylsiloxane)bis(3-aminopropyl) terminated, poly(dimethylsiloxane)bis(hydroxyalkyl) terminated, poly(dimethylsiloxane)chlorine terminated, poly(dimethylsiloxane) diglycidyl ether terminated, poly(dimethylsiloxane-co-diphenylsiloxane)dihydroxy terminated, poly(dimethylsiloxane-co-diphenylsiloxane) divinyl terminated, poly(dimethylsiloxane-co-diphenylsiloxane)trimethylsilyl terminated, poly[dimethylsiloxane-co-[2-(3,4-epoxycyclohexyl)ethyl]methylsiloxane], poly(dimethylsiloxane) ethoxylate dihydroxy terminated, poly(dimethylsiloxane)hydride terminated, poly(dimethylsiloxane)carboxyl terminated, poly[dimethylsiloxane-co-[3-[2-(2-hydroxyethoxy]propyl]methylsiloxane]poly(dimethylsiloxane)hydroxy terminated, poly(dimethylsiloxane)methoxy terminated, poly(dimethylsiloxane-co-methylhydrosiloxane), poly(dimethylsiloxane-co-methylhydrosiloxane) hydride terminated, poly(dimethylsiloxane-co-methylhydrosiloxane) trimethylsilyl terminated, poly(dimethylsiloxane-co-methylphenylsiloxane), poly[dimethylsiloxane-co-methyl(3,3,3-trifluoropropyl)siloxane], poly(dimethylsiloxane) monoglycidyl ether terminated, and poly(dimethylsiloxane) monohydroxy terminated.

The number of silicon atoms in the structure of compound 2 can vary. In some embodiments, the number of silicon atoms in the structure of compound 2 is from 6 to 10. An example of compound 2 in a structure of polyhedral oligosilsesquioxane (POSS) containing 7 silicon atoms is exemplified below:

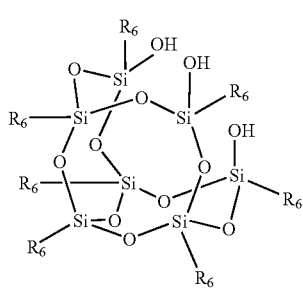

(2)

Examples of the materials corresponding to compound 2 include, but are not limited to, 1,3,5,7,9,11,14-hepta-isooctyltricyclo[7.3.3.1$^{5,11}$]heptasiloxane-endo-3,7,14-triol(trisilanolisooctyl-POSS, $C_{56}H_{122}O_{12}Si_7$), 1,3,5,7,9,11,14-heptacyclopentyltricyclo[7.3.3.1$^{5,11}$]heptasiloxane-endo-3,7,14-triol(trisilanol-POSS, $C_{35}H_{66}O_{12}Si_7$), 1,3,5,7,9,11,14-heptaisobutyltricyclo[7.3.3.1$^{5,11}$]heptasiloxane-endo-3,7,14-triol (isobutyltrisilanol-POSS, $C_{28}H_{66}O_{12}Si_7$), 1,3,5,7,9,11-octacyclopentyltetracyclo[7.3.3.1$^{5,11}$]octasiloxane-endo-3,7-diol(cyclopentyldisilanol-POSS, $C_{40}H_{74}O_{13}Si_8$), 3,5,7,9,11,13,15-heptacyclopentylpentacyclo[9.5.1.1$^{3,9}$.1$^{5,15}$.1$^{7,13}$]octasiloxane-1-ol(silanol-POSS, $C_{35}H_{64}O_{13}Si_8$), 3,7,14-tris{[3-(epoxypropoxy)propyl]dimethylsilyloxy}-1,3,5,7,9,11,14-heptacyclopentyltricyclo[7.3.3.1$^{5,11}$]heptasiloxane tris[(epoxypropoxypropyl)dimethylsilyloxy]-POSS, $C_{59}H_{114}O_{18}Si_{10}$], 3-[(3,5,7,9,11,13,15-heptacyclopentylpentacyclo[9.5.1.1$^{3,9}$.1$^{5,15}$.1$^{7,13}$]octasiloxan-1-yloxy)dimethylsilyl]propyl-methacrylate(dimethylsilyloxy(propyl) methacrylate-POSS, $C_{44}H_{80}O_{15}Si_9$), 9-{dimethyl[2-(5-norbonen-2-yl)ethyl]silyloxy}-1,3,5,7,9,11,14-heptacyclopentyltricyclo[7.3.3.1$^{5,11}$]heptasiloxane-1,5-diol ([(dimethyl(norbonenylethyl)silyloxy)dihydroxy]-POSS, $C_{46}H_{84}O_{12}Si_8$), ethyl-3,5,7,9,11,13,15-heptacyclopentylpentacyclo[9.5.1.1$^{3,9}$.1$^{5,15}$.1$^{7,13}$]octasiloxane-1-undecanoate (ethylundecanoate-POSS, $C_{48}H_{88}O_{14}Si_8$), methyl-3,5,7,9,11,13,15-heptacyclopentylpentacyclo[9.5.1.1$^{3,9}$.1$^{5,15}$.1$^{7,13}$]octasiloxane-1-propionate (methylpropionate-POSS, $C_{39}H_{70}O_{14}Si_8$), 1-[2-(3,4-epoxycyclohexyl) ethyl]-3,5,7,9,11,13,15-heptacyclopentylpentacyclo[9.5.1.1$^{3,9}$.1$^{5,15}$.1$^{7,13}$]octasiloxane(epoxycyclohexylethyl-POSS, $CH_{76}O_{13}Si_8$), 1-(2-(3,4-epoxycyclohexyl)ethyl)-3,5,7,9,11,13,15-isobutylpentacyclo[9.5.1.1$^{3,9}$.1$^{5,15}$.1$^{7,13}$]octasiloxane (epoxycyclohexylisobutyl-POSS, $C_{36}H_{76}O_{13}Si_8$), 1-[2-(3-cyclohexene-1-yl)ethyl]-3,5,7,9,11,13,15-heptacyclopentylpentacyclo[9.5.1.1$^{3,9}$.1$^{5,15}$.1$^{7,13}$]octasiloxane(cyclohexenylethyl-POSS, $C_{43}H_{76}O_{12}Si_8$), 1-[2-(5-norbonen-2-yl)ethyl]-3,5,7,9,11,13,15-heptacyclopentylpentacyclo[9.5.1.1$^{3,9}$.1$^{5,15}$.1$^{7,13}$]octasiloxane(norbonenylethyl-POSS, $C_{44}H_{76}O_{12}Si_8$), 1-(2-trans-cyclohexanediol)ethyl-3,5,7,9,11,13,15-isobutylpentacyclo-[9.5.1.1$^{3,9}$.1$^{5,15}$.1$^{7,13}$]octasiloxane(trans-cyclohexanediolisobutyl-POSS, $C_{36}H_{78}O_{14}Si_8$), 1-(3-(2-aminoethyl)amino)propyl-3,5,7,9,11,13,15-isobutylpentacyclo[9.5.1.1$^{(3,9)}$.1$^{(5,15)}$.1$^{(7,13)}$]octasiloxane(aminoethylaminopropylisobutyl-POSS, $C_{33}H_{76}N_2O_{12}Si_8$), 1-(3-chloropropyl)-3,5,7,9,11,13,15-heptacyclopentylpentacyclo[9.5.1.1$^{3,9}$.1$^{5,15}$.1$^{7,13}$]octasiloxane (3-chloropropyl-POSS, $C_{38}H_{69}C_1O_{12}Si_8$), 1-(3-cyclohexen-1-yl)-3,5,7,9,11,13,15-heptacyclopentylpentacyclo[9.5.1.1$^{3,9}$.1$^{5,15}$.1$^{7,13}$]octasiloxane (cyclohexenyl-POSS, $C_{41}H_{72}O_{12}Si_8$), 3-(3,5,7,9,11,13,15-heptacyclopentylpentacyclo[9.5.1.1$^{3,9}$.1$^{5,15}$.1$^{7,13}$]octasiloxan-1-yl)propyl-methacrylate (methacrylatepropyl-POSS, $C_{41}H_{72}O_{14}Si_8$), 1-(4-vinylphenyl-3,5,7,9,11,13,15-heptacyclopentylpentacyclo[9.5.1.1$^{3,9}$.1$^{5,15}$.1$^{7,13}$]octasiloxane(vinylphenyl-POSS, $C_{43}H_{70}O_{12}Si_8$), 1-(hydridodimethylsilyloxy)-3,5,7,9,11,13,15-heptacyclopentylpentacyclo[9.5.1.1$^{3,9}$.1$^{5,15}$.1$^{7,13}$]octasiloxane (hydridodimethylsilyloxy-POSS, $C_{37}H_{70}O_{13}Si_9$), 1-allyl-3,5,7,9,11,13,15-heptacyclopentylpentacyclo[9.5.1.1$^{3,9}$.1$^{5,15}$.1$^{7,13}$]octasiloxane(allyl-POSS, $C_{38}H_{68}O_{12}Si_8$), 1-(allyldimethylsilyloxy)-3,5,7,9,11,13,15-heptacyclopentylpentacyclo[9.5.1.1$^{3,9}$.1$^{5,15}$.1$^{7,13}$]octasiloxane(allyldimethylsilyloxy-POSS, $C_{40}H_{74}O_{13}Si_9$), 3,5,7,9,11,13,15-heptacyclopentylpentacyclo[9.5.1.1$^{3,9}$.1$^{5,15}$.1$^{7,13}$]octasiloxane-1-butyronitrile(3-cyanopropyl-POSS, $C_{39}H_{69}NO_{12}Si_8$), 1-chloro-3,5,7,9,11,13,15-heptacyclopentylpentacyclo[9.5.1.1$^{(3,9)}$.1$^{(5,15)}$.1$^{(7,13)}$]octasiloxane(chloro-POSS, $C_{35}H_{63}C_1O_{12}Si_8$), (glycidoxypropyldimethylsilyloxy)heptacyclopentylpentacyclooctasiloxane (glycidoxypropyldimethylsilyloxy-POSS, $C_{43}H_{80}O_{15}Si_9$), (methylphenylvinylsilyloxy)heptacyclopentylpentacyclooctasiloxane(methylphenylvinylsilyloxy-POSS, $C_{44}H_{74}O_{13}Si_9$) and 1-vinyl-3,5,7,9,11,13,15-isobutylpentacyclo[9.5.1.1$^{3,9}$.1$^{5,15}$.1$^{7,13}$]octasiloxane (monovinylisobutyl-POSS, $C_{30}H_{66}O_{12}Si_8$).

In some embodiments, compound 1 can be prepared by polymerization of monomers selected from the following compounds 3 and 4.

$(OR_7)_n Si$—$(R_8)_m$ (n+m=4)  (3)

$(R_9)_n SiX_m$ (n+m=4)  (4)

In compounds 3 and 4, $R_7$, $R_8$ and $R_9$ can be independently linear, branched or cyclic $C_1$-$C_{12}$ hydrocarbons containing one or more alkyl, alkoxy, ketone, acryl, methacryl, allyl, aromatic, halogen, amino, mercapto, ether, ester, sulfone, nitro, hydroxyl, cyclobutene, carbonyl, carboxyl, alkyd, urethane, vinyl, nitrile, hydrogen, or epoxy functional group; X is hydrogen, chlorine, bromine or iodine; n is an integer between 1 and 4; and m is an integer between 0 and 3.

In some embodiments, one or more of the hydrogens in the $C_1$-$C_{12}$ hydrocarbon group are substituted with fluorine. In some embodiments, 4 to 8 hydrogens in the $C_1$-$C_{12}$ hydrocarbon group are substituted with fluorine.

The dielectric film of the present invention can be prepared by coating a solution containing compound 1 and/or compound 2 on a glass or plastic substrate. Alternatively, the dielectric film of the present invention can be prepared by obtaining a solution containing an organic silicon based polymer having compound 1 and/or compound 2 as a new monomer and then coating the solution thus obtained on the glass or plastic substrate.

As an example of the latter process, the process involves subjecting compound 1 or 2 having a polymerizable double bond or triple bond alone or a mixture thereof to thermal polymerization or photo-polymerization to cross-link and solidify them, as shown in Reaction Scheme 1 below. R and R' independently represent an initiator. Examples of usable initiators include, but are not limited to, aluminum 2-butoxide, aluminum butoxyethoxide, zirconium propoxide, titanium ethoxide, 1-methyl imidazole and boron trifluoride diethyl etherate. The amount of initiator added can vary. In some embodiments, the initiator is added in an amount of 1% to 10% by weight based on the amount of silicon present.

(Reaction Scheme 1)

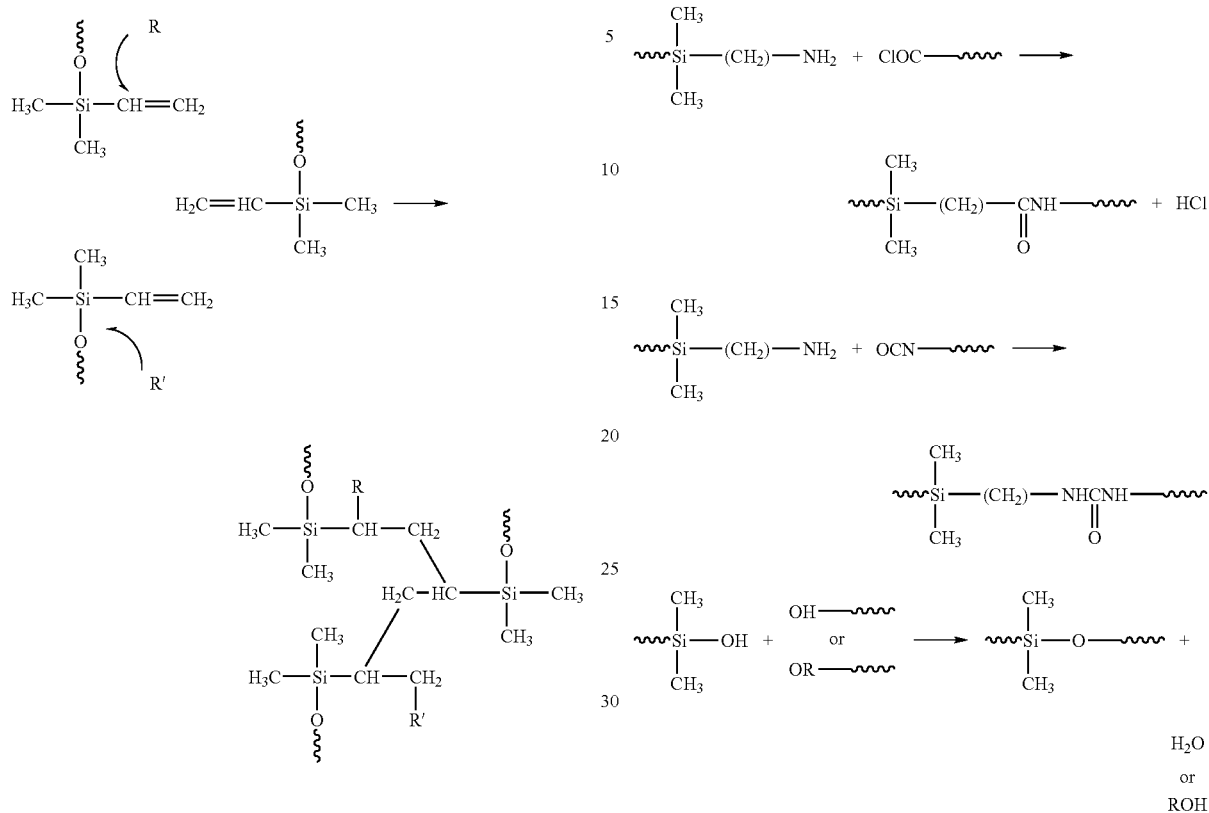

For the reaction in Reaction Scheme 1, the reaction conditions can vary. In some embodiments, the reaction occurs at a temperature of 80° C. to 100° C. for 1 to 5 hours.

(Reaction Scheme 2)

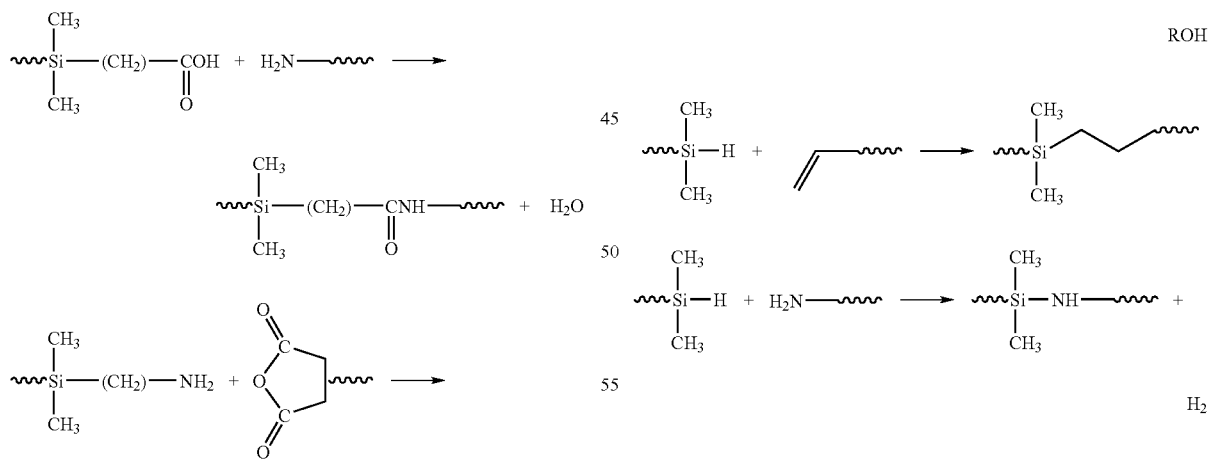

In Reaction Scheme 2, the condensation conditions can vary. In some embodiments, the reaction occurs at a temperature of 100° C. to 350° C. for 1 to 5 hours.

The method in Reaction Scheme 3 involves combining compound 1 or 2 containing a polymerizable functional group with a silicon alkoxide having a functional group polymerizable with the compound 1 or 2, followed by a sol-gel process including hydrolysis and condensation.

(Reaction Scheme 3)

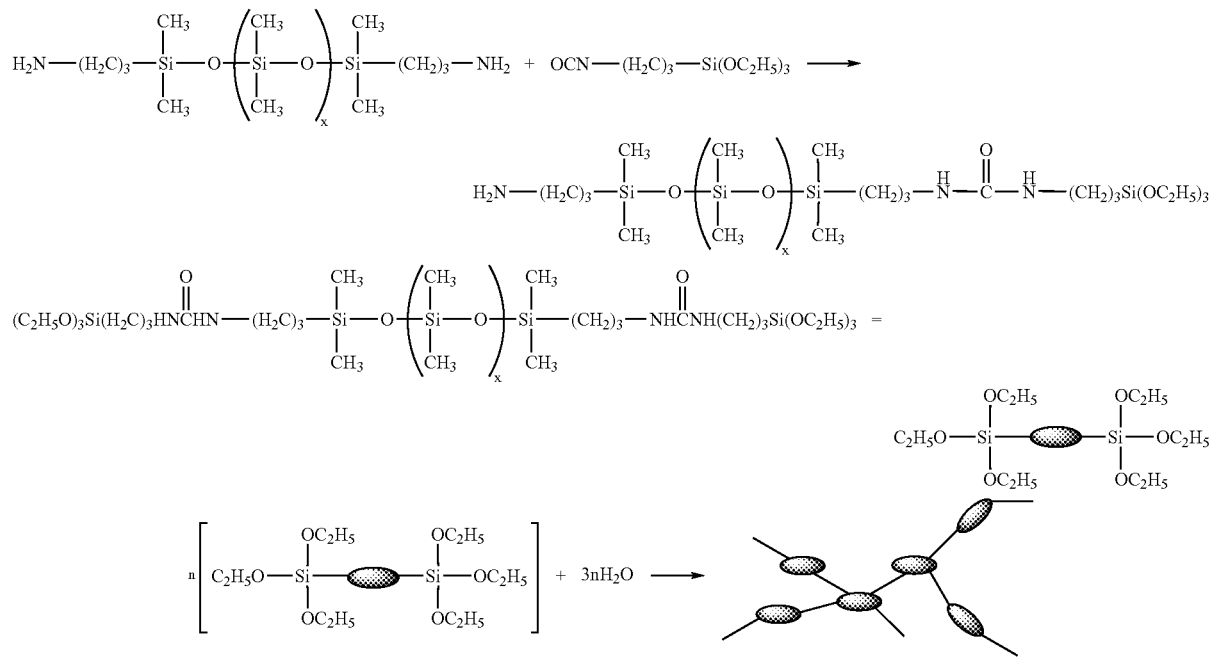

In Reaction Scheme 3, although the sol-gel process can vary, it is sufficient to perform hydrolysis and condensation of alkoxysilane in the presence of acidic and basic catalyst. In some embodiments, this hydrolysis and condensation is performed at room temperature for 4 to 24 hours. In some embodiments, the solvent such as alcohol or water is removed at a temperature of 60° C. to 100° C.

In preparing the dielectric composition in accordance with the first aspect of the present invention, a suitable cross-linking agent can be added, if necessary. In some embodiments, peroxide-type cross-linking agents are used. For example, suitable cross-linking agents include, but are not limited to, 2,5-dimethyl, 2,5-t-butylperoxy hexane, dibenzoyl peroxide, diacyl peroxide, peroxy dicarbonate, alkyl perester, dialkyl peroxide, perketal, ketone peroxide, and alkyl hydroperoxide. The amount of cross-linking agent added can vary. In some embodiments, cross-linking agent is added in an amount from 2% to 10% by weight.

In accordance with the second aspect of the present invention, there is provided a dielectric/barrier rib composition for a plasma display panel comprising a cross-linked product between at least one compound selected from compound 1 or 2, or inorganic/organic hybrid materials having compound 1 or 2 as a monomer, and another organic monomer or an oligomer having a molecular weight of less than 10,000, polymerizable with compound 1 or 2, or inorganic/organic hybrid materials, and having a structure differing from that of compound 1 or 2. Under some synthetic conditions inorganic/organic hybrid materials having ring- or ladder-shaped inorganic backbones that are different from those of compound 1 or 2 can be made from compound 3 or 4.

In some embodiments, the organic monomer can be a linear, branched, or cyclic $C_1$-$C_{12}$ hydrocarbon compound containing one or more groups selected from alkyl, alkoxy, ketone, acryl, methacryl, allyl, aromatic, halogen, amino, mercapto, ether, ester, sulfone, nitro, hydroxyl, cyclobutene, carbonyl, carboxyl, alkyd, urethane, vinyl, nitril, hydrogen, and epoxy functional groups.

The oligomer having an average molecular weight of less than 10,000 refers to a compound having an average molecular weight of less than 10,000 obtained by polymerizing the organic monomer. In order to include the above-mentioned functional groups within the oligomer, in some embodiments at least 2 functional groups in the organic monomer are included. For example, in order to obtain the oligomer having an epoxy group as the functional group, vinyl group of 1,2-epoxy-5-hexene as the organic monomer can be polymerized to obtain an oligomer having an epoxy functional group with a number average molecular weight of less than 10,000, depending on polymerization conditions.

The dielectric composition thus prepared is in the form of a liquid resin and the plasma display panel formed by using this composition can be prepared as follows:

(1) For the panel in accordance with the first aspect of the present invention, in some embodiments the dielectric is formed on the glass or plastic substrate using coating or application methods. In some embodiments, the dielectric is prepared by thermal or UV calcination.

(2) For the panel in accordance with the second aspect of the present invention, in some embodiments the dielectric is prepared by transferring, on the glass or plastic substrate, a transfer film having the dielectric formed on a base material for transferring.

Further, the composition of the present invention can contain surfactant, dye, pigment, metal and metal oxide particles, a metal alkoxide, or complex thereof, in order to improve characteristics such as coating quality of coated film, adhesion between substrates, adhesion and thermal expansion coefficient matching between compounds in different layers, transparency, dielectric strength, reflectivity and dielectric constant. In particular, for the barrier rib in the plasma display panel, in some embodiments white or black pigment is added in order to increase reflectivity.

Now, the present invention will be described in more detail with reference to the following Examples. These Examples are provided only for illustrating the present invention and should not be construed as limiting the scope and spirit of the present invention.

EXAMPLES

Example 1

To PDMS having a vinyl group (molecular weight: 28,000, Bayer) was added 5% by weight of 2,5-dimethyl-2,5-t-butylperoxy hexane (Aldrich) as a cross-linking agent. The mixture was then coated to a thickness of about 30 μm on a glass substrate having ITO vapor deposited thereon using a spin coating or bar coating method, and then cross-linked at a temperature of 150° C. for 1 hour to prepare a dielectric. DC (direct current) breakdown voltage of the dielectric was measured according to ASTM D149. Each electrode had a spherical shape with a diameter of 12.7 mm, and a short period test method was used in which voltage was applied constantly to a test electrode starting at 0 volt and increasing until dielectric breakdown occurred. The dielectric constant was measured with an LCR meter, and transmittance was measured using UV-visible spectroscopy (see Table 1).

Example 2

10 g of polydimethylsiloxane bis(3-aminopropyl) terminated (molecular weight: 27,000, Aldrich) and 2.2 g of pyromellitic dianhydride were dissolved in 30 g of N-methyl-2-pyrollidone and were subjected to a condensation reaction under nitrogen atmosphere for 12 hours to prepare polyamic acid solution. The resulting solution was coated in the same manner as in Example 1 and cured at temperatures of 100° C., 200° C., and 300° C. for 1 hour, respectively, to obtain a polyimide-siloxane dielectric having a thickness of 20 μm. The subsequent procedure is the same as in Example 1.

Example 3

Divinyl siloxane bis-benzocyclobutene (Dow Chemical) was coated on the ITO coated glass substrate using the same manner as used in Example 1 and then cured at 180° C. for 2 hours to prepare a dielectric film having a thickness of 20 μm. The subsequent procedure is the same as in Example 1.

Example 4

9.417 g of epoxycyclohexylisobutyl-polysilsesquioxene (molecular weight: 1026, Aldrich) and 3.664 g of bis(3,4-epoxycyclohexylmethyl)adipate (Aldrich) were dissolved in 10 g of tetrahydrofuran and stirred at room temperature for 3 hours. As an initiator, aluminum 2-butoxide was added thereto to be 5% by weight of the total epoxy groups and then cured at 120° C. for 2 hours to prepare a dielectric. The subsequent procedure is the same as in Example 1.

Example 5

13.11 g of 3-methacryloxypropyltrimethoxysilane (Aldrich) and 10.05 g of diisobutylsilanediol were mixed, and 0.1 g of sodium hydroxide was added as a catalyst and the mixture was reacted at 80° C. for 3 hours to prepare a solution. As the initiator for UV curing, 0.25 g of 2,2-dimethoxy-2-phenyl-acetophenone (Aldrich) was added to the resulting solution and the dielectric film was formed in accordance with the procedure in Example 1. By using a 500 W mercury lamp, UV light was irradiated to photo-cure the dielectric film at 3J/cm$^2$ and then thermally cured at 150° C. for 4 hours to perform final curing. The subsequent procedure is the same as in Example 1.

Example 6

13.11 g of 3-glycidoxypropyltrimethoxysilane (Aldrich) and 10.05 g of diisobutylsilanediol were mixed, and 0.1 g of sodium hydroxide was added as a catalyst, and the mixture was reacted at 80° C. for 3 hours to prepare a solution. The solution thus prepared was heated to 60° C. under vacuum to completely extract methanol and then 10 g of MEK-ST (Nissan Chemical), a silica sol dispersed in methylethylketone, was added and mixed. An epoxy initiator, 0.1 g of 1-methylimidazole, was added to the mixed solution, and a dielectric film was coated on the ITO coated glass substrate using the bar coating method and thermally cured at 150° C. for 3 hours to obtain a final dielectric film. The subsequent procedure is the same as in Example 1.

TABLE 1

Physical properties of the dielectrics

| | Breakdown voltage (kV) | Thickness (μm) | Dielectric strength (V/μm) | Dielectric constant | Transmittance (%) |
|---|---|---|---|---|---|
| Example 1 | 4.3 | 20 | 215 | 2.8~3.0 (1 MHz) | >90 |
| Example 2 | 4.8 | 20 | 240 | 3.1~3.6 (1 MHz) | >85 |
| Example 3 | 5.0 | 20 | 250 | 2.7~3.0 (1 MHz) | >90 |
| Example 4 | 3.9 | 20 | 195 | 3.0~4 | >85 |
| Example 5 | 3.5 | 20 | 175 | 3.2~4 (1 MHz) | >88 |
| Example 6 | 4.5 | 20 | 225 | 3.0~3.5 (1 MHz) | >75 |

The dielectric/barrier rib composition in accordance with the present invention has characteristics similar to those of a conventional dielectric layer utilizing glass paste, and the dielectric film can be formed through a relatively simple process by a variety of coating methods. Further, in accordance with the present invention, the dielectric/barrier rib composition has a low dielectric constant due to the absence of Pb. Additionally, it is possible to calcine the dielectric/barrier rib composition at a low temperature of less than 200° C. and easily form the dielectric film from the liquid phase thereof using coating methods.

These examples illustrate possible methods of the present invention. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A plasma display panel comprising a dielectric/barrier rib, the dielectric/barrier rib prepared from a composition comprising a compound 1 of formula

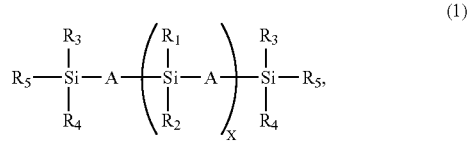

or at least one compound belonging to a polyhedral oligosilsesquioxane (compound 2) having $R_6SiO_{1.5}$ as a repeating unit, or compounds 1 and 2, wherein X is an integer inclusive of zero; $R_1$, $R_2$, $R_3$, $R_4$, $R_5$ and $R_6$ are independently a substituted or unsubstituted linear, branched or cyclic $C_1$-$C_{12}$ hydrocarbon group, and compound 1 or compound 2 contain one or more groups selected from ketone, acryl, methacryl, amino, mercapto, ether, ester, sulfone, hydroxyl, cyclobutene, carbonyl, carboxyl, alkyd, urethane, and epoxy functional groups; and A is oxygen or —NH—.

2. A plasma display panel comprising a dielectric/barrier rib, the dielectric/barrier rib prepared from a composition comprising a cross-linked product between at least one compound selected from: compound 1 of formula

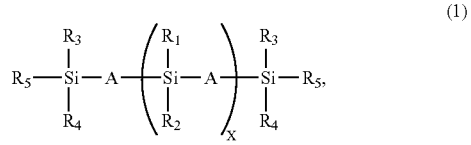

a polyhedral oligosilsesquioxane (compound 2) having $R_6SiO_{1.5}$ as a repeating unit, or compounds 1 and 2 and an organic monomer or an oligomer having a molecular weight of less than 10,000, which are polymerizable with compound 1, 2 or compounds 1 and 2, wherein X is an integer inclusive of zero, $R_1$, $R_2$, $R_3$, $R_4$, $R_5$ and $R_6$ are independently a substituted or unsubstituted linear, branched or cyclic $C_1$-$C_{12}$ hydrocarbon group, and compound 1 or compound 2 contain one or more groups selected from ketone, acryl, methacryl, amino, mercapto, ether, ester, sulfone, hydroxyl, cyclobutene, carbonyl, carboxyl, alkyd, urethane, and epoxy functional group, and A is oxygen or —NH—.

3. The plasma display panel comprising a dielectric/barrier rib of claim 2, wherein the compound 1 is selected from the group consisting of poly[dimethylsiloxane-co-(3-aminopropyl)methylsiloxane], poly(dimethylsiloxane)bis(hydroxyalkyl) terminated, poly(dimethylsiloxane)diglycidyl ether terminated, poly[dimethylsiloxane-co-[2-(3,4-epoxycyclohexyl)ethyl]methylsiloxane], poly(dimethylsiloxane) carboxyl terminated, poly(dimethylsiloxane-co-methylhydrosiloxane), poly[dimethylsiloxane-co-methyl(3,3,3-trifluoropropyl)siloxane], and poly(dimethylsiloxane) monoglycidyl ether terminated.

4. The plasma display panel comprising a dielectric/barrier rib of claim 1, wherein the compound 2 is selected from the group consisting of 1,3,5,7,9,11,14-hepta-isooctyltricyclo[7.3.3.1$^{5,11}$]heptasiloxane-endo-3,7,14-triol), 1,3,5,7,9,11, 14-heptacyclopentyltricyclo[7.3.3.1$^{5,11}$]heptasiloxane-endo-3,7,14-triol, 1,3,5,7,9,11,14-hepta-isobutyltricyclo [7.3.3.1$^{5,11}$]heptasiloxane-endo-3,7,14-triol, 1,3,5,7,9,11-octacyclopentyltetracyclo[7.3.3.1$^{5,11}$]octasiloxane-endo-3, 7-diol, 3,5,7,9,11,13,15-heptacyclopentylpentacyclo [9.5.1.1$^{3,9}$.1$^{5,15}$.1$^{7,13}$]octasiloxane-1-ol, 3,7,14-tris{[3-(epoxypropoxy)propyl]dimethylsilyloxy}-1,3,5,7,9,11,14-heptacyclopentyltricyclo[7.3.3.1$^{5,11}$]heptasiloxane, 3-[(3,5, 7,9,11,13,15-heptacyclopentylpentacyclo[9.5.1.1$^{3,9}$.1$^{5,15}$. 1$^{7,13}$]octasiloxan-1-yloxy)dimethylsilyl]propyl-methacrylate, 9-{dimethyl[2-(5-norbonen-2-yl)ethyl]silyloxy}-1,3,5, 7,9,11,14-heptacyclopentyltricyclo[7.3.3.1$^{5,11}$]heptasiloxane-1,5-diol, ethyl-3,5,7,9,11,13,15-heptacyclopentylpentacyclo[9.5.1.1$^{3,9}$.1$^{5,15}$.1$^{7,13}$] octasiloxane-1-undecanoate, methyl-3,5,7,9,11,13,15-heptacyclopentylpentacyclo[9.5.1.1$^{3,9}$. 1$^{5,15}$.1$^{7,13}$] octasiloxane-1-propionate, 1-[2-(3,4-epoxycyclohexyl)ethyl]-3,5,7,9,11,13,15-heptacyclopentylpentacyclo[9.5.1.1$^{3,9}$.1$^{5,15}$.1$^{7,13}$]octasiloxane, 1-(2-(3,4-epoxycyclohexyl)ethyl)-3,5,7,9,11,13,15-isobutylpentacyclo [9.5.1.1$^{3,9}$.1$^{5,15}$.1$^{7,13}$]octasiloxane, 1-[2-(3-cyclohexen-1-yl) ethyl]-3,5,7,9,11,13,15-heptacyclopentylpentacyclo [9.5.1.1$^{3,9}$.1$^{5,15}$.1$^{7,13}$]octasiloxane, 1-[2-(5-norbonen-2-yl) ethyl]-3,5,7,9,11,13,15-heptacyclopentylpentacyclo [9.5.1.1$^{3,9}$.1$^{5,15}$.1$^{7,13}$]octasiloxane, 1-(2-trans-cyclohexanediol)ethyl-3,5,7,9,11,13,15-isobutylpentacyclo [9.5.1.1$^{3,9}$.1$^{5,15}$.1$^{7,13}$]octasiloxane, 1-(3-(2-aminoethyl) amino)propyl-3,5,7,9,11,13,15-isobutylpentacyclo[9.5.1. 1$^{3,9}$.1$^{5,15}$.1$^{7,13}$]octasiloxane, 1-(3-chloropropyl)-3,5,7,9,11, 13,15-heptacyclopentylpentacyclo[9.5.1.1$^{3,9}$.1$^{5,15}$.1$^{7,13}$]octasiloxane, 1-(3-cyclohexen-1-yl)-3,5,7,9,11,13,15-heptacyclopentylpentacyclo[9.5.1.1.1$^{3,9}$.1$^{5,15}$.1$^{7,13}$]octasiloxane, 3-(3,5,7,9,1 1,13,15-heptacyclopentylpentacyclo[9.5.1. 1$^{3,9}$.1$^{5,15}$.1$^{7,13}$]octasiloxan1-1-yl)propylmethacrylate, 1-(4-vinylphenyl-3,5,7,9,11,13,15-heptacyclopentylpentacyclo [9.5.1.1$^{3,9}$.1$^{5,15}$.1$^{7,13}$]octasiloxane, 1-(hydridodimethylsilyloxy)-3,5,7,9,11,13,15-heptacyclopentylpentacyclo [9.5.1.1$^{3,9}$.1$^{5,15}$.1$^{7,13}$]octasiloxane, 1-allyl-3,5,7,9,11,13,15-heptacyclopentylpentacyclo[9.5.1.1$^{3,9}$.1$^{5,15}$.1$^{7,13}$] octasiloxane, 1-(allyldimethylsilyloxy)-3,5,7,9,1 1,13,15-heptacyclopentylpentacyclo[9.5.1.1$^{3,9}$.1$^{5,15}$.1$^{7,13}$] octasiloxane, 3,5,7,9,11,13,15-heptacyclopentylpentacyclo [9.5.1.1$^{3,9}$.1$^{5,15}$.1$^{7,13}$]octasiloxane-1-butyronitrile, 1-chloro-3,5,7,9,11,13,15-heptacyclopentylpentacyclo[9.5.1.1$^{3,9}$. 1$^{5,15}$.1$^{7,13}$] octasiloxane, (glycidoxypropyldimethylsilyloxy) heptacyclopentylpentacyclooctasiloxane, (methylphenylvinylsilyloxy)heptacyclopentylpentacyclooctasiloxane, and 1-vinyl-3,5,7,9,11,13,15-isobutylpentacyclo-[9.5.1.1$^{3,9}$. 1$^{5,15}$.1$^{7,13}$]octasiloxane.

5. The plasma display panel comprising a dielectric/barrier rib of claim 2, wherein the compound 2 is selected from the group consisting of 1,3,5,7,9,11,14-hepta-isooctyltricyclo [7.3.3.1$^{5,11}$]heptasiloxane-endo-3,7,14-triol), 1,3,5,7,9,11, 14-heptacyclopentyltricyclo[7.3.3.1$^{5,11}$]heptasiloxane-endo-3,7,14-triol, 1,3,5,7,9,11,14-hepta-isobutyltricyclo [7.3.3.1$^{5,11}$]heptasiloxane-endo-3,7,14-triol, 1,3,5,7,9,11-octacyclopentyltetracyclo[7.3.3.1$^{5,11}$]octasiloxane-endo-3, 7-diol, 3,5,7,9,11,13,15-heptacyclopentylpentacyclo [9.5.1.1$^{3,9}$.1$^{5,15}$.1$^{7,13}$]octasiloxane-1-ol, 3,7,14-tris{[3-(epoxypropoxy)propyl]dimethylsilyloxy}-1,3,5,7,9,11,14-heptacyclopentyltricyclo[7.3.3.1$^{5,11}$]heptasiloxane, 3-[(3,5, 7,9,11,13,15-heptacyclopentylpentacyclo[9.5.1.1$^{3,9}$.1$^{5,15}$. 1$^{7,13}$]octasiloxan-1-yloxy)dimethylsilyl]propyl-methacrylate, 9-{dimethyl[2-(5-norbonen-2-yl)ethyl]silyloxy}-1,3,5, 7,9,11,14-heptacyclopentyltricyclo[7.3.3.1$^{5,11}$]heptasiloxane-1,5-diol, ethyl-3,5,7,9,11,13,15-heptacyclopentylpentacyclo[9.5.1.1$^{3,9}$.1$^{5,15}$.1$^{7,13}$]

octasiloxane-1-undecanoate, methyl-3,5,7,9,11,13,15-heptacyclopentylpentacyclo[9.5.1.1$^{3,9}$.1$^{5,15}$.1$^{7,13}$]octasiloxane-1-propionate, 1-[2-(3,4-epoxycyclohexyl)ethyl]-3,5,7,9,11,13,15-heptacyclopentylpentacyclo [9.5.1.1$^{3,9}$.1$^{5,15}$.1$^{7,13}$]octasiloxane, 1-(2-(3,4-epoxycyclohexyl)ethyl)-3,5,7,9,11,13,15-isobutylpentacyclo[9.5.1.1$^{3,9}$.1$^{5,15}$.1$^{7,13}$]octasiloxane, 1-[2-(3-cyclohexen-1-yl)ethyl]-3,5,7,9,11,13,15-heptacyclopentylpentacyclo [9.5.1.1$^{3,9}$.1$^{5,15}$.1$^{7,13}$]octasiloxane, 1-[2-(5-norbonen-2-yl)ethyl]-3,5,7,9,11,13,15-heptacyclopentylpentacyclo [9.5.1.1$^{3,9}$.1$^{5,15}$.1$^{7,13}$]octasiloxane, 1-(2-trans-cyclohexanediol)ethyl-3,5,7,9,11,13,15-isobutylpentacyclo [9.5.1.1$^{3,9}$.1$^{5,15}$.1$^{7,13}$]octasiloxane, 1-(3-(2-aminoethyl)amino)propyl-3,5,7,9,11,13,15-isobutylpentacyclo-[9.5.1.1$^{(3,9)}$.1$^{(5,15)}$.1$^{(7,13)}$]octasiloxane, 1-(3-chloropropyl)-3,5,7,9,11,13,15-heptacyclopentylpentacyclo[9.5.1.1$^{3,9}$.1$^{5,15}$.1$^{7,13}$]octasiloxane, 1-(3-cyclohexen-1-yl)-3,5,7,9,11,13,15-heptacyclopentylpentacyclo [9.5.1.1$^{3,9}$.1$^{5,15}$.1$^{7,13}$]octasiloxane, 3-(3,5,7,9,11,13,15-heptacyclopentylpentacyclo[9.5.1.1$^{3,9}$.1$^{5,15}$.1$^{7,13}$]octasiloxan-1-yl)propylmethacrylate, 1-(4-vinylphenyl-3,5,7,9,11,13,15-heptacyclopentylpentacyclo [9.5.1.1$^{3,9}$.1$^{5,15}$.1$^{7,13}$]octasiloxane, 1-(hydridodimethylsilyloxy)-3,5,7,9,11,13,15-heptacyclopentylpentacyclo [9.5.1.1$^{3,9}$.1$^{5,15}$.1$^{7,13}$]octasiloxane, 1-allyl-3,5,7,9,11,13,15-heptacyclopentylpentacyclo[9.5.1.1$^{3,9}$.1$^{5,15}$.1$^{7,13}$]octasiloxane, 1-(allyldimethylsilyloxy)-3,5,7,9,11,13,15-heptacyclopentylpentacyclo[9.5.1.1$^{3,9}$.1$^{5,15}$.1$^{7,13}$]octasiloxane, 3,5,7,9,11,13,15-heptacyclopentylpentacyclo [9.5.1.1$^{3,9}$.1$^{5,15}$.1$^{7,13}$]octasiloxane-1-butyronitrile, 1-chloro-3,5,7,9,11,13,15-heptacyclopentylpentacyclo[9.5.1.1$^{3,9}$.1$^{5,15}$.1$^{7,13}$]octasiloxane, (glycidoxypropyldimethylsilyloxy)heptacyclopentylpentacyclooctasiloxane, (methylphenylvinylsilyloxy)heptacyclopentylpentacyclooctasiloxane, and 1-vinyl-3,5,7,9,11,13,15-isobutylpentacyclo-[9.5.1.1$^{3,9}$.1$^{5,15}$.1$^{7,13}$]octasiloxane.

6. A method of making the plasma display panel comprising a dielectric/barrier rib composition of claim 1, the method comprising (a) combining the compound 1 or 2 with a silicon alkoxide having a functional group polymerizable with the compound 1 or 2, and (b) sol-gel processing the composition of (a), wherein the sol-gel processing includes hydrolysis and condensation.

7. A method of making the plasma display panel comprising a dielectric/barrier rib composition of claim 2, the method comprising (a) combining the compound 1 or 2 with a silicon alkoxide having a functional group polymerizable with the compound 1 or 2, and (b) sol-gel processing the composition of (a), wherein the sol-gel processing includes hydrolysis and condensation.

8. The plasma display panel comprising a dielectric/barrier rib composition of claim 1, wherein the organic monomer is a substituted or unsubstituted linear, branched or cyclic $C_1$-$C_{12}$ hydrocarbon compound containing one or more groups selected from ketone, acryl, methacryl, amino, mercapto, ether, ester, sulfone, hydroxyl, cyclobutene, carbonyl, carboxyl, alkyd, urethane, and epoxy functional groups.

9. The plasma display panel comprising a dielectric/barrier rib composition of claim 1, wherein one or more hydrogens in the substituted or unsubstituted $C_1$-$C_{12}$ hydrocarbon group is substituted with fluorine.

10. The plasma display panel comprising a dielectric/barrier rib composition of claim 2, wherein one or more hydrogens in the substituted or unsubstituted $C_1$-$C_{12}$ hydrocarbon group is substituted with fluorine.

11. The plasma display panel comprising a dielectric/barrier rib composition of claim 1, further comprising metal, metal oxide particles, metal alkoxides or complexes thereof.

12. The plasma display panel comprising a dielectric/barrier rib composition of claim 2, further comprising metal, metal oxide particles, metal alkoxides or complexes thereof.

13. The plasma display panel comprising a dielectric/barrier rib composition of claim 1, further comprising a white or black pigment.

14. The plasma display panel comprising a dielectric/barrier rib composition of claim 2, further comprising a white or black pigment.

15. A plasma display panel comprising a film of the dielectric/barrier rib composition of claim 1, wherein the film is formed on a glass substrate or plastic substrate.

16. The plasma display panel of claim 15, wherein the glass display substrate is soda lime glass.

17. A plasma display panel comprising a film of the dielectric/barrier rib composition of claim 2, wherein the film is formed on a glass substrate or plastic substrate.

18. The plasma display panel of claim 17, wherein the glass display substrate is soda lime glass.

19. A method of making the plasma display panel of claim 15, wherein the film of the dielectric/barrier rib composition is formed by (a) applying the composition on a glass substrate or plastic substrate and (b) calcining with heat or UV light.

20. A method of making the plasma display panel of claim 17, wherein the film of the dielectric/barrier rib composition is formed by (a) applying the composition on a glass substrate or plastic substrate and (b) calcining with heat or UV light.

21. The plasma display panel of claim 15, wherein the film of the dielectric/barrier rib composition is formed on a transfer film, and the transfer film includes a base material for transfer and the film of the dielectric/barrier rib composition formed on the base material.

22. The plasma display panel of claim 17, wherein the film of the dielectric/barrier rib composition is formed on a transfer film, and the transfer film includes a base material for transfer and the film of the dielectric/barrier rib composition formed on the base material.

* * * * *